United States Patent
Carlson et al.

(10) Patent No.: US 7,339,685 B2
(45) Date of Patent: Mar. 4, 2008

(54) METHOD AND APPARATUS FOR ELECTRONICALLY GENERATING AN OUTLINE INDICATING THE SIZE OF AN ENERGY ZONE IMAGED ONTO THE IR DETECTOR OF A RADIOMETER

(75) Inventors: Paul Carlson, Santa Cruz, CA (US); Patrick Parker, Felten, CA (US); Alex S. Nikittin, San Jose, CA (US); Thomas Heinke, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 144 days.

(21) Appl. No.: 11/369,289

(22) Filed: Mar. 6, 2006

(65) Prior Publication Data
US 2006/0152737 A1 Jul. 13, 2006

Related U.S. Application Data

(63) Continuation-in-part of application No. 10/776,385, filed on Feb. 10, 2004, now Pat. No. 7,164,467.

(51) Int. Cl.
*G01B 11/14* (2006.01)

(52) U.S. Cl. ........................ 356/614; 356/620; 374/130

(58) Field of Classification Search ................ 356/601, 356/614, 620; 374/121, 130
See application file for complete search history.

(56) References Cited

U.S. PATENT DOCUMENTS

| 4,343,182 | A |   | 8/1982 | Pompei |
| 4,494,881 | A | * | 1/1985 | Everest ........................ 374/124 |
| 5,133,605 | A | * | 7/1992 | Nakamura ................... 374/124 |
| 6,234,669 | B1 |  | 5/2001 | Kienitz |
| 7,164,467 | B2 | * | 1/2007 | Heinke et al. .............. 356/4.03 |
| 2006/0050766 | A1 | * | 3/2006 | Hollander et al. ........... 374/121 |

* cited by examiner

*Primary Examiner*—Roy M. Punnoose
(74) *Attorney, Agent, or Firm*—Charles E. Krueger

(57) ABSTRACT

A radiometer includes a sighting system that generates a digital image of an object surface having an area that is to be imaged onto the IR detector. A shape outline is overlaid on the digital image of an object surface to indicate the extent of the energy zone that is imaged onto the IR detector. In one embodiment, a shape is displayed between the locations of two imaged skewed laser dots to indicate the extent of the energy zone without requiring a range determination.

7 Claims, 16 Drawing Sheets

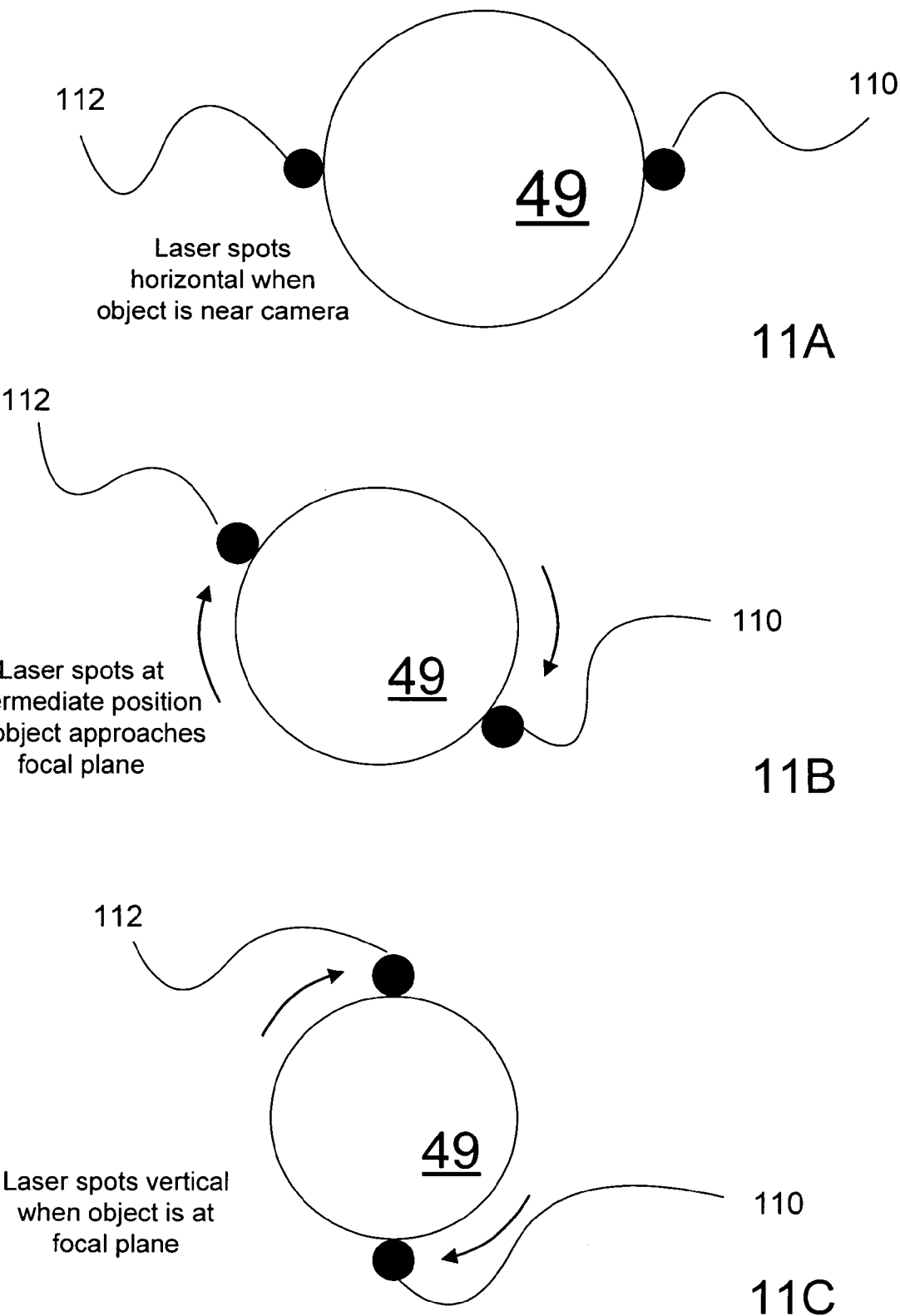

7 inches 24 inches

Far focus

METHOD AND APPARATUS FOR ELECTRONICALLY GENERATING AN OUTLINE INDICATING THE SIZE OF AN ENERGY ZONE IMAGED ONTO THE IR DETECTOR OF A RADIOMETER

RELATED APPLICATIONS

This application is a continuation-in-part (CIP) of the commonly-assigned patent application entitled METHOD AND APPARATUS FOR ELECTRONICALLY GENERATING AN OUTLINE INDICATING THE SIZE OF AN ENERGY ZONE IMAGED ONTO THE IR DETECTOR OF A RADIOMETER, filed Feb. 10, 2004, application Ser. No. 10/776,385 now U.S. Pat. No. 7,164,467 which is hereby incorporated by reference for all purposes.

BACKGROUND OF THE INVENTION

The invention relates to a device for remote or non-contact temperature measurement. Such a devices, which is known in the art as a radiometer, performs non-contact temperature measurement and comprises a detector for receiving heat radiation emanating from an energy zone on an object surface of an object of measurement, an infrared (IR) optical system for imaging the heat radiation emanating from the energy zone onto the detector and a sighting arrangement for identifying the position and size of the energy zone on the object of measurement by means of visible light. A further processing arrangement which converts the detector signal into a temperature indication is also connected to the detector.

In this case the IR optical system is so designed that at a certain measurement distance for the most part only heat radiation from a certain area of the object of measurement, namely the energy zone, is focused onto the detector. In most cases the size of the energy zone is defined by the area from which 90% of the heat rays focused onto the detector are emitted. However, applications are also known in which there are reference to values between 50% and 100%.

The pattern of the dependence of the size of the energy zone upon the measurement distance depends upon the design of the IR optical system. A fundamental distinction is made between distant focusing and close focusing. In distant focusing the IR optical system images the detector into infinity and in close focusing it images it onto the focus plane at a finite distance. In the case of distant focusing it is necessary to deal with an energy zone size which grows linearly with the measurement distance, whereas in close focusing the energy zone size can decrease between the radiometer and the focus plane.

In non-contact temperature measurement it is indispensable in practical use that the energy zone on the object to be examined should be rendered visible in a suitable way. In the past, various attempts were made to render the position and size of the energy zone, which is invisible per se, visible by illumination. According to JP-A-47-22521 a plurality of rays which originate from several light sources or are obtained by reflection from a light source are directed along the marginal rays of a close-focused optical system onto the object of measurement. In this way the size and position of the energy zone for a close-focused system can be rendered visible by an annular arrangement of illuminated points around the energy zone.

U.S. Pat. No. 5,368,392 describes various methods of outlining energy zones by laser beams. These include the mechanical deflection of one or several laser beams as well as the splitting of a laser beam by a beam divider or a fiber optic system into several single beams which surround the energy zone. However, these sighting arrangements can only be used in an optical system which images into infinity. In an optical system which images into the finite an image of the detector is reduced and then enlarged by the optical system along an optical axis onto an energy zone on the object from the optical system to the so-called sharp point energy zone.

In U.S. Pat. No. 6,234,669, which is assigned to the assignee of the present application, a device for non-contact temperature measurement of an object is described with an IR optical system in which an image of the detector along an optical axis is imaged onto an energy zone on the object in such a way that the image of the detector decreases in size between the optical system and a sharp point focus zone and then enlarges. A sighting arrangement is also described which identifies the outer limit of the energy zone by means of visible sighting rays. Each sighting ray is aligned obliquely with respect to the optical axis in such a way that each sighting ray can be used both before and also after the sharp point energy zone to identify the energy zone.

Accordingly, improved systems for indicating the extent of the energy zone to a user are the subject of active investigation in the industry.

BRIEF SUMMARY OF THE INVENTION

In one embodiment of the invention, a digital imaging system is utilized to provide an image of the object surface having an area whose temperature is to be measured by a radiometer. An outlining pattern, such as a circle, is overlaid on the displayed image of the object surface to indicate the extent of the energy zone.

In another embodiment of the invention, a video subsystem for displaying an image of an object locates a laser spot projected onto the object which is utilized to determine the size and location of a shape to overlay over a displayed image to indicate the extent of the energy zone.

In another embodiment of the invention, data for generating circles of different diameters is stored in non-volatile memory. The location of the projected laser spot in the image is utilized to select correct circle data for generating a circle having the correct diameter to indicate the extent of the energy zone.

In another embodiment of the invention, a laser sighting system using a pair of laser beams skewed to indicate the width of the energy zone at different distances is utilized. An image controller utilizes the distance between the image spots to overlay a circle having its center at the midpoint between the imaged laser spots and having a radius equal to one half the distance between the imaged laser spots.

Other features and advantages of the invention will be apparent in view of the following detailed description and appended drawings.

BRIEF DESCRIPTION OF THE DRAWINGS

FIGS. 11A-C depict the laser spots at various distances from the radiometer;

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Various embodiments of the invention implement a sighting system for radiometers with a close focus point. For these types of radiometers, the IR beam profile starts with a large beam diameter at the instrument, which gets smaller and smaller as the distance diminishes to the focus point, where it reaches a minimum, then it grows again. For non-contact temperature measurement, knowledge of the beam diameter size at a given distance is important since it is the size of the beam diameter at the intersection of the beam and the object surface that defines the energy zone.

A first embodiment will now be described that uses a video camera and an electronic display which shows an image of the object being measured. A circle is electronically generated and overlaid over the image of the object being measured to indicate the true energy zone position and diameter on the display. The size and diameter of the circle are calculated inside the instrument from the known beam profile and the distance between the measured object surface and the radiometer. In this embodiment, in addition to showing the correct spot size, the offset between the video camera and the infrared channel is also compensated. The same electronic display can show the measured temperature and set parameters of the instrument.

Figure 1:
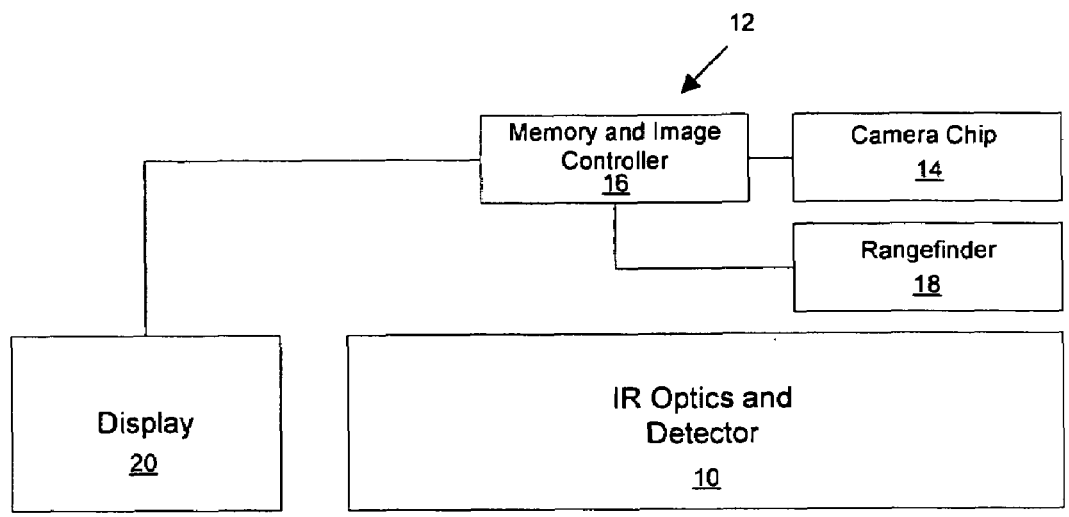
FIG. 1 is a high-level block diagram depicting an embodiment of the invention.

FIG. 1 is a high level block diagram of this embodiment. In this embodiment a standard radiometer 10 including IR optics and a detector can be designed as disclosed in commonly-assigned U.S. Pat. No. 5,836,694 which is hereby incorporated by reference for all purposes. A video sighting system 12 includes a Camera Chip 14, a Memory and Image Controller block 16, a Rangefinder 18, and a Display 20.

Figure 2:
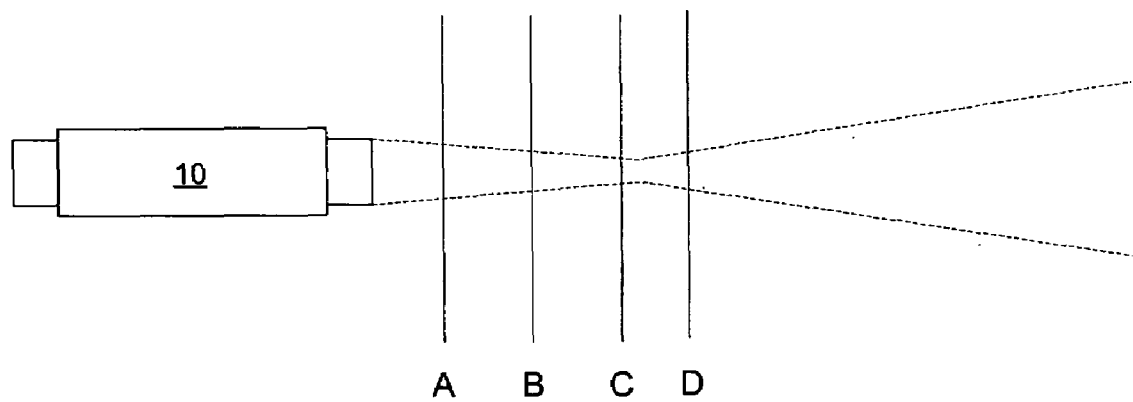
FIG. 2 is a view depicting the focusing characteristics for a near focus system.

As described above, the energy zone is the area on an object that is imaged onto the IR detector. FIG. 2 depicts a cross-section of the beam profile for a near-focus radiometer. The vertical lines A, B, C and D represent objects at four different image planes.

Figure 3:
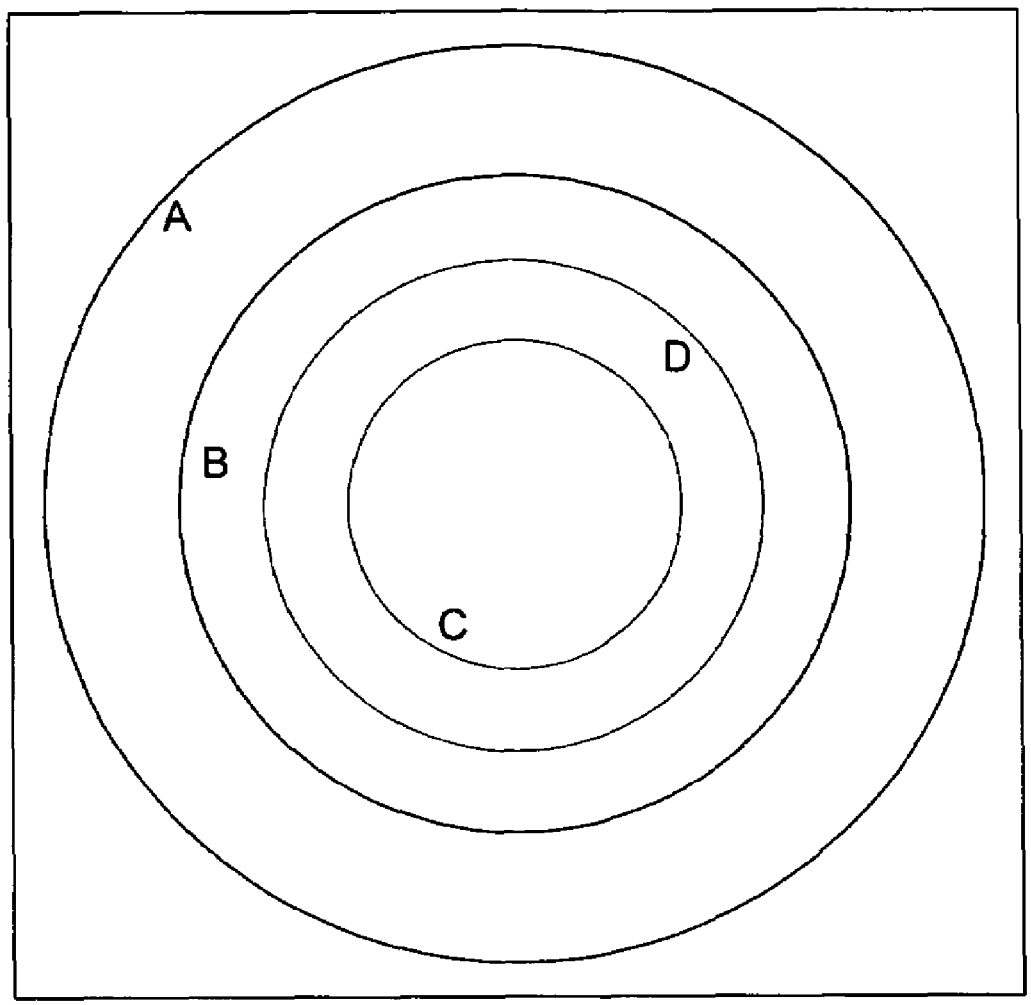
FIG. 3 is a diagram depicting the size of the energy zone at different distances.

FIG. 3 depicts the display device with circles superimposed over the image of an object surface generated by the imaging system. The circles A, B, C, and D correspond to the size of the energy zone on the object when the object is positioned at image plane A, B, C, or D in FIG. 2. Accordingly, the size of the circle is determined by the distance of the object from the radiometer. In this example, the size of the circles decreases with increasing distance from the radiometer because all the image planes are located between the radiometer and the sharp focus spot.

Figure 4:
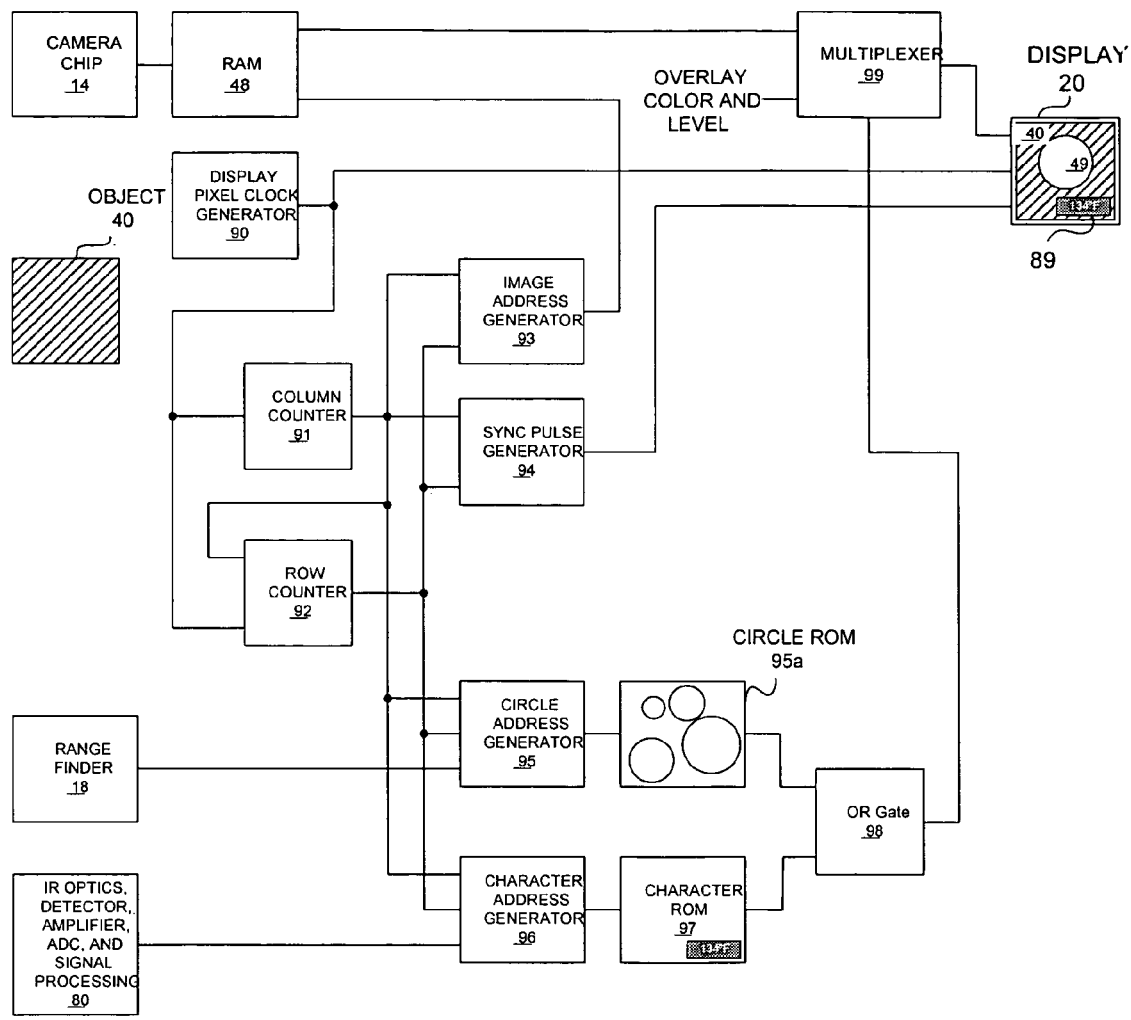
FIG. 4 is a block diagram of an embodiment of the invention.

The operation of an embodiment of the invention will now be described with reference to FIG. 4. In FIG. 4 the object surface to be imaged is a rectangular surface 40. As described above, the rays emitting from a circular energy zone of the object will be imaged onto the IR detector and the temperature of the part of the object surface included in the energy zone will be calculated by the radiometer.

The sighting system includes the Camera Chip 14, and the Rangefinder 18, and a RAM 48. The image of the surface 40 is stored in the RAM 48. The RAM might need to be multi-ported, which can be achieved in various ways, for example, by combining the RAM with a CPLD or an FPGA, etc.

The display system includes a Display Pixel Clock Generator 90, a Column Counter 91, a Row Counter 92, an Image Address Generator 93, a Sync Pulse Generator 94, a Circle Address Generator 95, a Circle ROM 95a, a Character Address Generator 96, a Character ROM 97, an OR Gate 98, a Multiplexer 99, and the Display 20.

The Pixel Clock generator 90 generates the pixel clock for the Display 20, the Column Counter 91, and the Row Counter 92. The Row Counter 92 changes state only at the end of a display line. The outputs of the Column Counter 91 and the Row Counter 92 are combined in the Image Address Generator 93 to generate the display image address. The display image address determines the output of the RAM 48. The output of the RAM 48 is usually passed to the Display 20 via the Multiplexer 99.

The outputs of the Column Counter 91 and the Row Counter 92 are also combined in the Sync Pulse Generator 94 to generate horizontal and vertical sync pulses for the display. This circuitry allows for different pixel clocks as well as different numbers of columns and rows for the Camera Chip 14 and the Display 20.

An inactive select-input of the Multiplexer 99 causes the images data from the RAM to be passed through to the display, so that the object surface 40 is displayed on the Display 20. An active select-input of the Multiplexer 99 puts a fixed input signal with regard of color and brightness (level) to the input of the Display 20, so that the display shows a pixel or pixels with this color and brightness instead of the object surface 40.

Thus, by controlling the select-input of the Multiplexer 99 synchronously with the pixel clock and the state of the Column Counter 91 and the Row Counter 92, any geometric FIG. 49 or text 89 can be shown on the Display 20 as an overlay.

The Circle ROM 95a stores circle data for generating images of different size circles with an output of the Circle ROM 95a coupled via the OR gate 98 the select-input of the Multiplexer 99. The outputs of the Column Counter 91, the Row Counter 92, and the Range Finder 18 are combined in the Circle Address Generator to provide the address data for the Circle ROM 95a.

The stored circles in the Circle ROM 95a have sizes that, when overlaid on the object image, indicate the extent of the displayed object surface included within the energy zone for a particular object distance. The selection of which of the circles, stored in the Circle ROM 95a, to overlay is defined by the output of the Range Finder 18.

The Circle ROM 95a is programmable and for a particular device responds to distance data from the Rangefinder 18 to select the correct circle data that indicates the correct size of the energy zone when overlaid on the image of the object surface provided by the Camera Chip 14. The Circle ROM 95a is also programmed to position the selected circle within the display to compensate for parallax due to misalignment between the optical axes of the IR optical system and the video camera system.

The Character ROM 97 stores data for generating text to indicate the object surface temperature. The IR Optics, Detector, and analog and digital signal processing chain 80 measures the IR signal, transmitted from the object surface, calculates the object surface temperature and provides a digital signal, which represents the object surface temperature. This signal is combined with the outputs of the Column Counter 91 and the Row Counter 92 inside the Character Address Generator to provide the address data for the Character ROM 97. The output of the Character ROM 97 controls via the OR gate 98 the select-input of the Multiplexer 99 to overlay the object surface temperature 89 information on the Display 20.

Because of the inclusive coupling of the outputs of the Circle ROM 95a and the Character ROM 97 both can be overlaid: a circle to show the zone of energy collection and text to indicate the object surface temperature.

The Display 20 in this embodiment is an LCD display. As depicted in FIG. 4, the Display Chip overlays a circle onto the image of the object surface to indicate the portion of the object surface included in the energy zone 49 as well as the temperature information 89.

Figure 7:
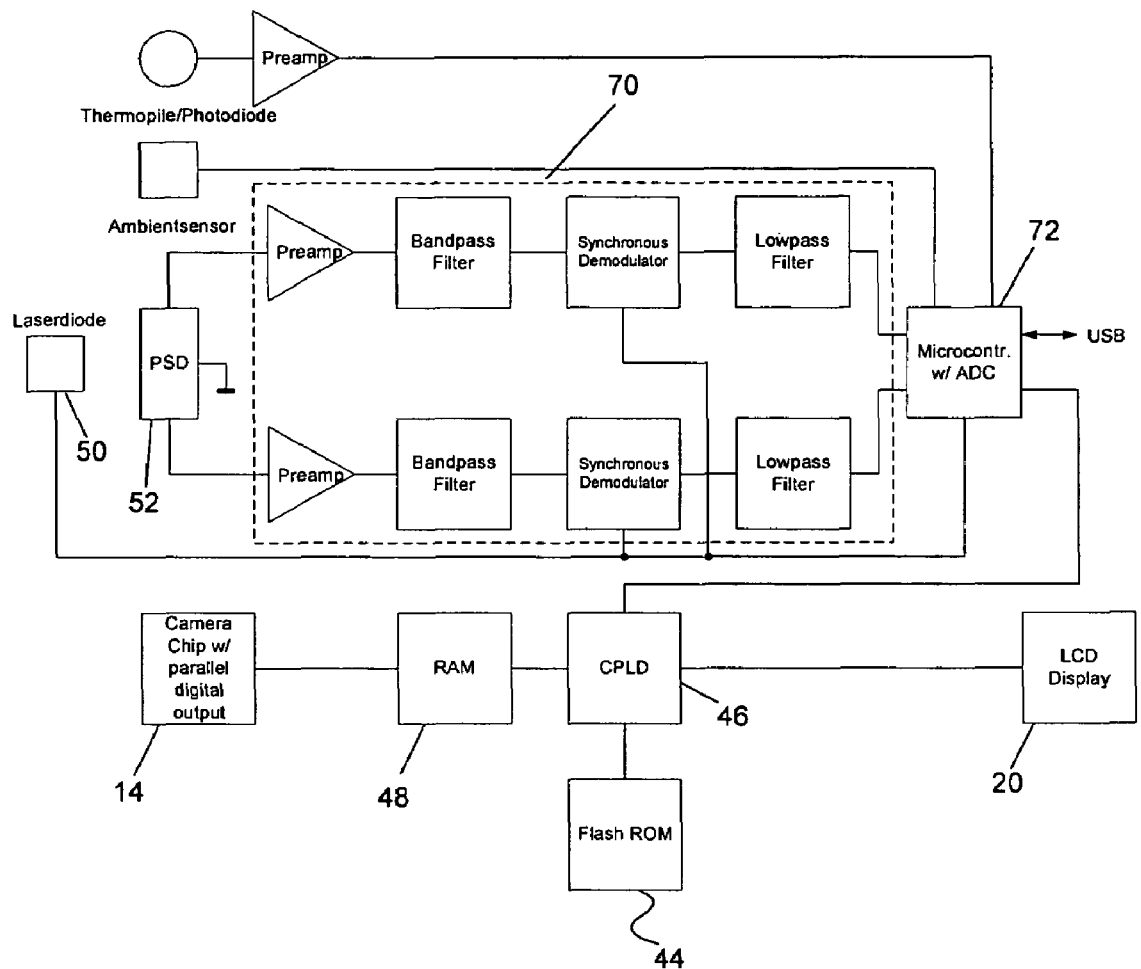
FIG. 7 is detailed block diagram of an embodiment of the invention.

In this embodiment, the components Column Counter 91, Row Counter 92, Image Address Generator 93, Sync Pulse Generator 94, Circle Address Generator 95, Character Address Generator 96, Or Gate 98, and Multiplexer 99 are combined in a single complex programmable logic chip (CPLD) 46, as shown in FIG. 7, described below. Also the Circle ROM 95a and the Character ROM 97 are combined in a single Flash ROM chip. The digital signal processing components of the Range Finder 18 as well as the IR signal processing chain 80 are combined in a single microcontroller chip 72, as shown in FIG. 7 as well.

Figure 4A:
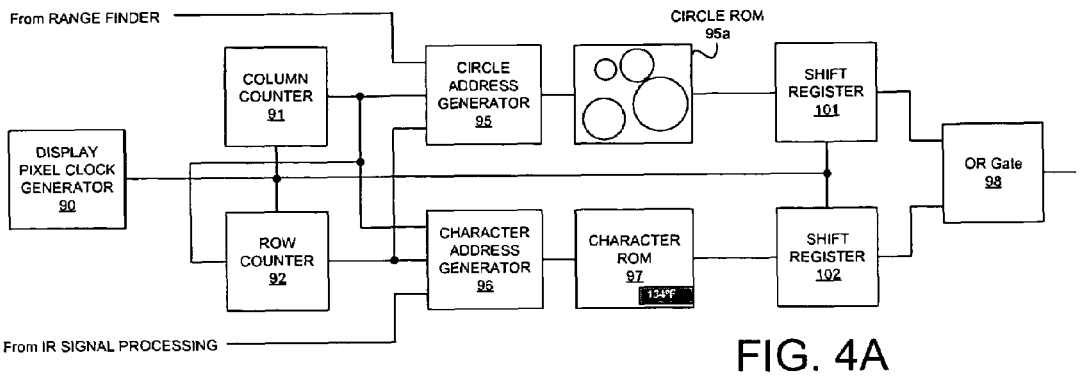
FIG. 4A is a block diagram of a first alternate embodiment of the invention.

A first alternative embodiment is depicted in FIG. 4A. In this embodiment the Display is an Organic LED (OLED) display. Further, in the embodiment depicted in FIG. 4 ROM chips with a data width of only 1 bit are required. The more practical approach is the use of standard 8 bit wide ROMs and to convert the 8 bit parallel output into a 1 bit serial output via the Shift Registers 101 and 102 as depicted in FIG. 4A.

Figure 4B:
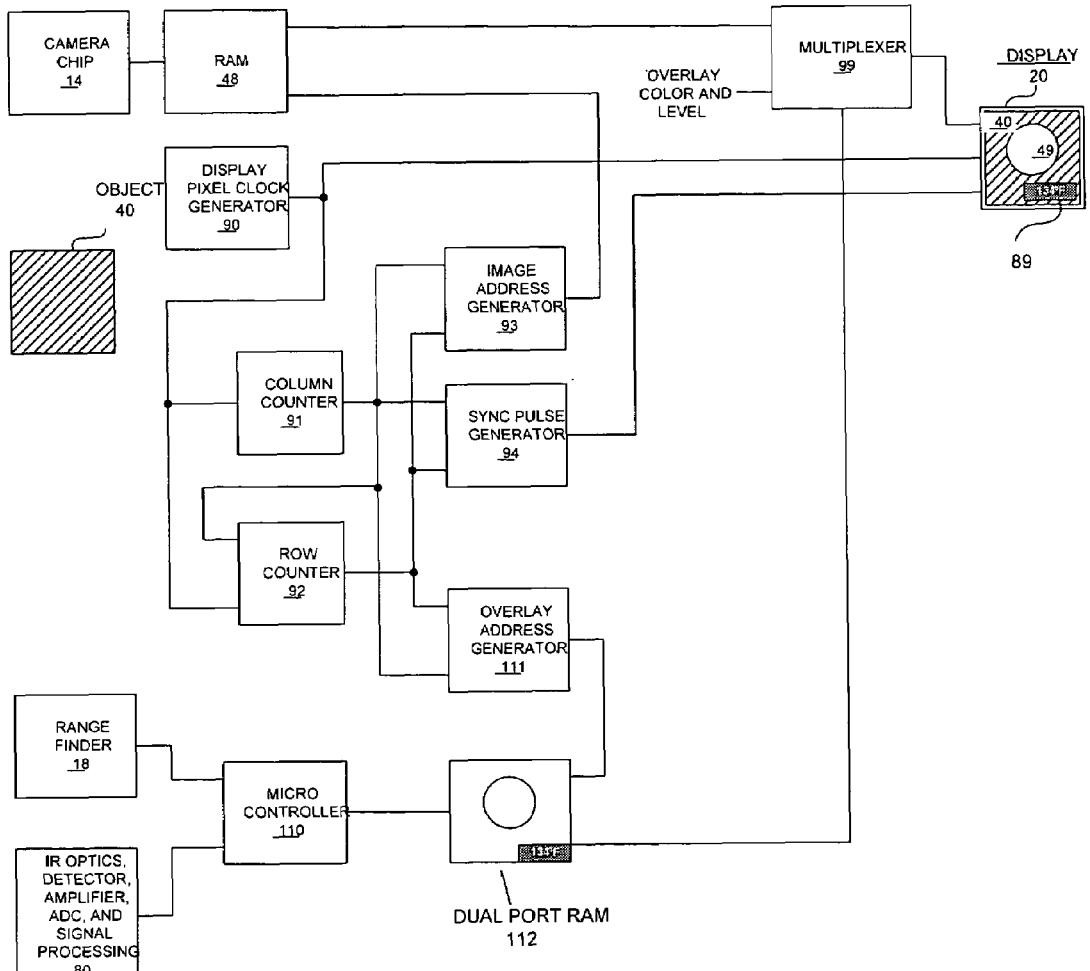
FIG. 4B is a block diagram of a second alternate embodiment of the invention.

A second alternative embodiment is depicted in FIG. 4B. The embodiment depicted in FIG. 4 would require fairly large ROM chips to implement the Circle ROM 95a as well as the Character ROM 97. A more practical approach is the use of a second RAM 112 as a general overlay memory as depicted in FIG. 4B. In this case the outputs of the Column Counter 91 and the Row Counter 92 form the overlay address inside the Overlay Address Generator 111 and the overlay address is used to read data from the Overlay RAM 112, which controls the Multiplexer 99. The overlay data is written by the Microcontroller 110 which calculates, in real time, both the overlay circle and the temperature indication text from the outputs of the Range Finder 18 and the IR Signal Processing 80. The Microcontroller 110 can physically be the same chip as the Microcontroller 72 in FIG. 7 described below.

Additionally, the Multiplexer 99 can have more than a single input for a fixed color and brightness. Instead it can have, for example, 3 inputs to implement 3 different overlay colors: one for the circle and temperature display within the normal range, one for the temperature display under range, and one for temperature display over range. In that case the data width of the Character ROM 97 (FIG. 4) or the RAM 112 (FIG. 4B) needs to be increased.

Figure 5:
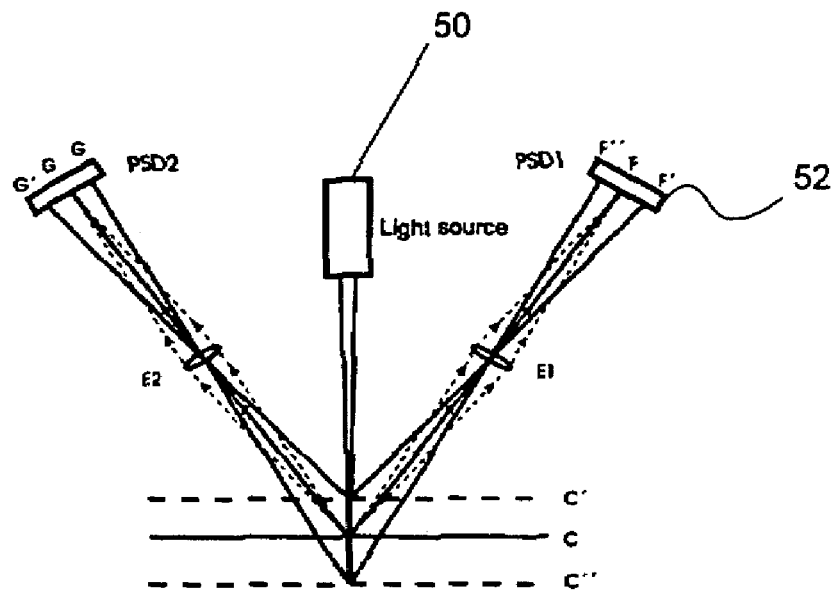
FIG. 5 is a diagram depicting an embodiment of a triangulation system.
Figure 6:
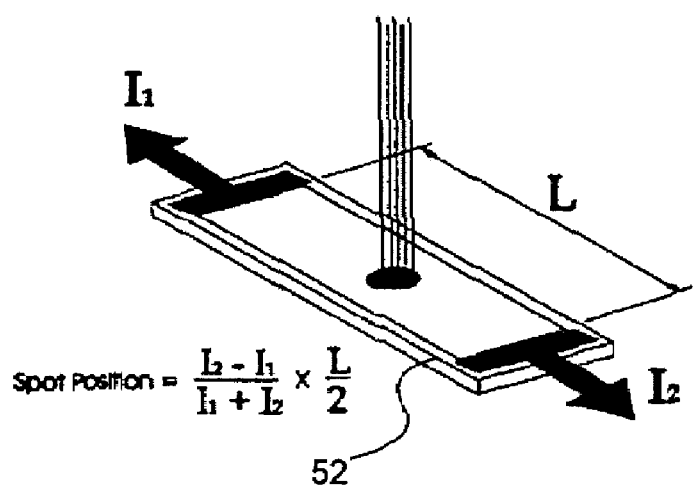
FIG. 6 is a perspective view of a position-sensitive diode.

In the presently described embodiment, the distance measurement is done by triangulation as depicted in FIGS. 5 and 6. In FIG. 5, a light source 50 sends a light beam that is reflected off the measured object surface. The reflected beam will hit an off-axis position sensitive photodiode (PSD) 52. As depicted in FIG. 6, the spot position of a reflected laser beam on the PSD 52 can be calculated by measuring $I_1$ and $I_2$.

For short distance systems, a complete off-the-shelf distance sensor, e.g., like GP2D12 manufactured by SHARP Corporation, can be used. FIG. 7 depicts a system for measuring long distances that utilizes a laser diode 50 as modulated light source and a lock-in-style electronics block 70 (narrow band filters, phase sensitive rectifiers, and low pass filters) to produce sufficient signal to noise ratio. The laser can be visible and coaxial with the infrared beam to indicate exactly the middle of the measured spot. This system can also be used for infinity focused instruments.

A MicroController 72 receives the $I_1$ and $I_2$ signal measurements which are digitized and utilized to calculate the distance to the object surface based on the magnitude of those signals. A calculated distance value is then transferred to the Display CPLD 46.

As is known by persons of skill in the art, other types of distance measuring systems such as time of flight measurement, phase-shift measurement, and interferometry, etc. can be utilized to measure the distance between the radiometer and the object.

An alternative embodiment of the circle displaying system that does not require a separate PSD will now be described. In this embodiment the video camera itself is used to determine the size and/or position of a displayed circle indicating the location of the energy zone. In one embodiment the laser sighting beam is coaxial with the IR optics and the video camera is off axis. Parallax effects will cause the position of the laser spot on the camera image to change position when an object is imaged at different locations relative to the camera. In this embodiment the imaged position of the laser spot is utilized to select the circle to be displayed to indicate the extent of the energy zone.

Figure 9:
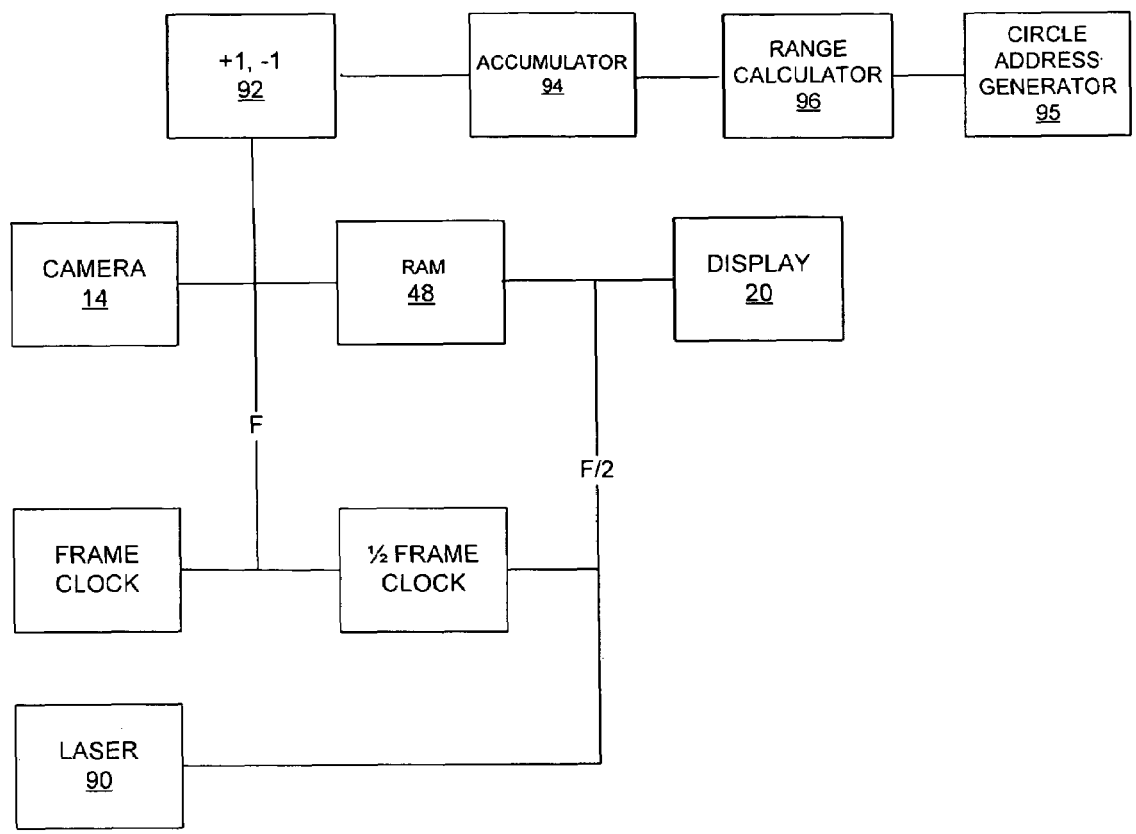
FIG. 9 is a block diagram of an embodiment utilizing the video sub-system to determine the size of a shape to be displayed.

One embodiment of the circle displaying system is depicted in FIG. 9. In FIG. 9, the digital camera 14 outputs frames to the RAM 48 at a frame rate F and the RAM 48 outputs frames to the display 20 at a frame rate of F/2 so that every other frame acquired by the camera is displayed. The laser 90 is modulated at F/2 and the display 20 and laser 90 are synchronized so that only frames acquired when the laser 90 is off are displayed.

The circle displaying system includes a +1, −1 multiplier 92, an accumulator 94, and a shape size calculator 96. As described above, the size of a displayed circle is determined by the position of the laser spot in the image so the shape size calculator functions to determine the location of this laser spot and to filter the spot from the viewed image. Since the laser 90 is modulated by the F/2 clock signal the laser spot appears in every other frame.

Figure 10:
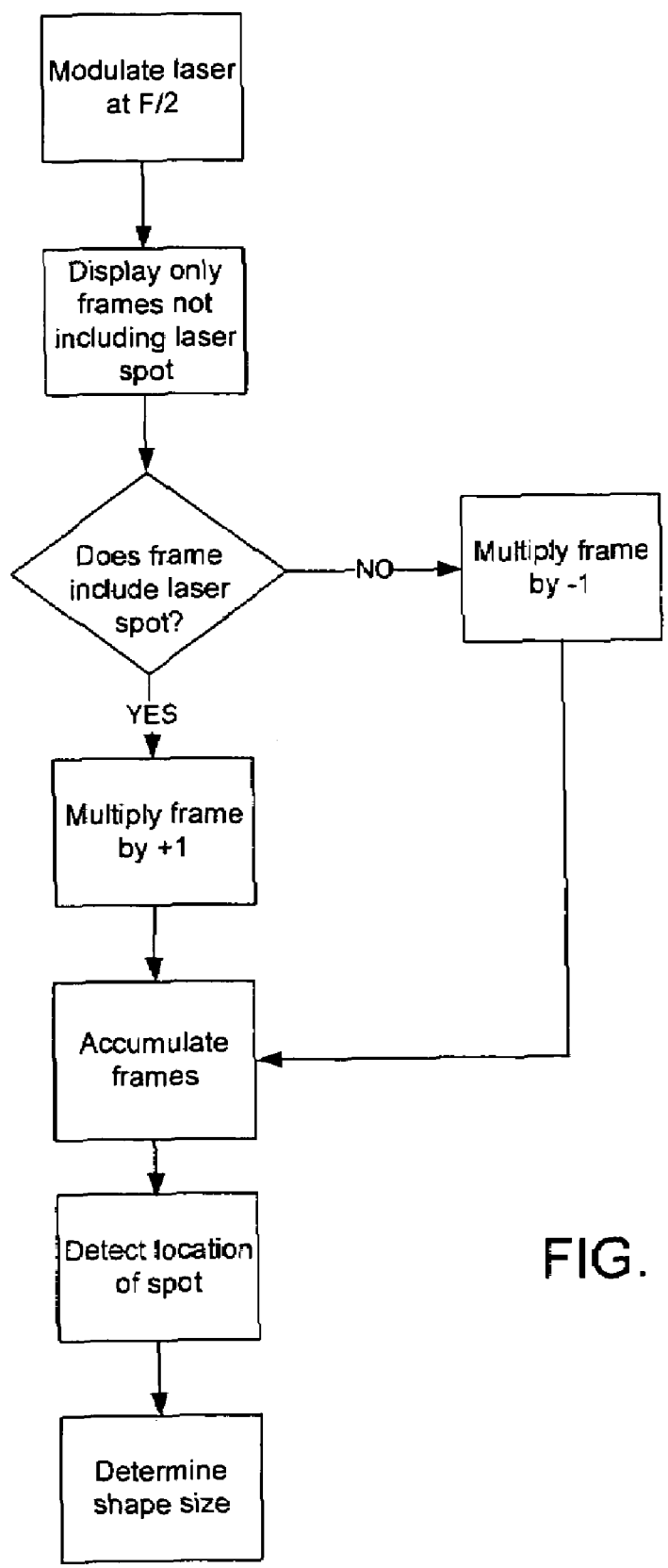
FIG. 10 is a flowchart depicting steps for utilizing the embodiment of FIG. 9.

As is known in the art, the modulated laser signal can be separated from the background signal by synchronous low-pass filtering techniques as described, for example, with reference to FIG. 7. One technique of identifying the location of the laser spot is a digital filtering system which will now be described with reference to FIG. 9 and the flow chart of FIG. 10.

The frames output from the camera are sent to the circle displaying system where frames including the laser spot are multiplied by +1 and frames not including the laser spot are multiplied by −1 and then stored in the accumulator memory 94. Thus, alternating frames input to the accumulator 94 are multiplied by +1 and −1. The laser 90 and +1, −1 multiplier 92 are synchronized so that images including the laser spot are multiplied by +1 and images not including the laser spot are multiplied by −1. The image of the object will be cancelled out by the subtraction so that only the image of the laser spot will be stored in the accumulator. When the data is read from the accumulator the address of the stored laser spot indicates the diameter of the circle to be displayed.

The shape size calculator 96 is programmed to indicate a circle diameter determined by the position of the laser spot in the image. For example, the circle shape size calculator could read the accumulator and compare each pixel value to a threshold value. When a pixel value exceeds the threshold value the address value is applied to a LUT to output a diameter value to select the circle to be displayed.

In one embodiment, the shape size calculator 96 determines the range to the target based on the location of the image laser spot. This range indication is then utilized as described above with reference to FIGS. 4, 4A, and 4B.

In one embodiment, the maximum brightness of the camera is reduced so that image pixels do not have the maximum value of the range of values so that the laser can be detected. For example, if the pixel range were 0-256, then if an image value were equal to 256 the laser beam would not be detectable. In this example, the maximum image value might be held to 200 by filtering the camera so the laser beam could increase the value to 256. In this case, if the image value is subtracted from the image plus laser value then the value left in the accumulator would be 56.

The diameter indication functions to select the circle to be displayed on the image of the object being measured using, for example, the techniques described above with reference to FIGS. 4 and 4A-B.

Figure 11:
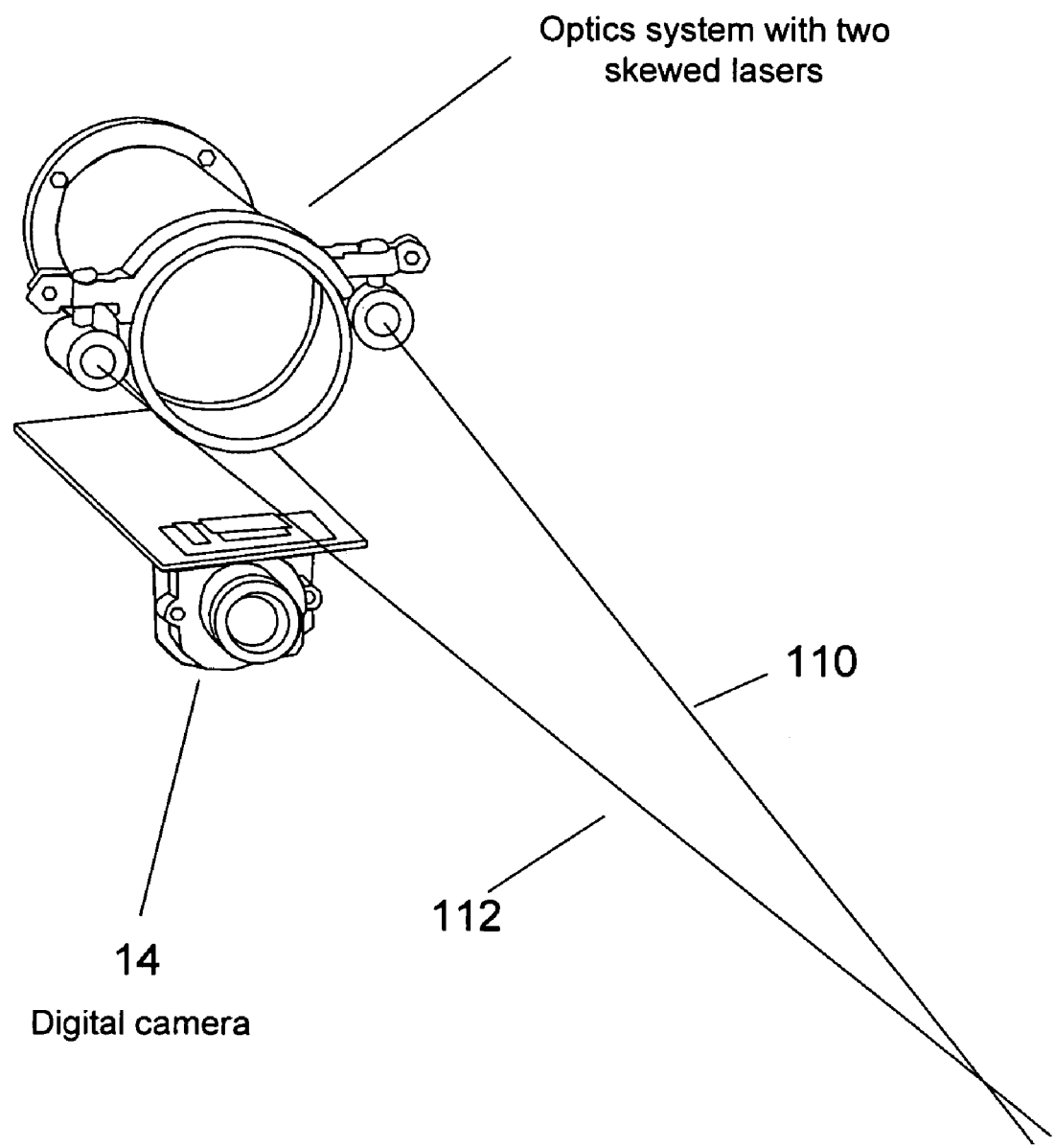
FIG. 11 is perspective view of a laser sighting system utilizing skewed laser beams.

An alternative embodiment utilizes a skewed laser beam system, as disclosed in U.S. Pat. No. 6,234,669, hereby incorporated by reference for all purposes, which includes at least two laser beams skewed to indicate the width of the energy spot at different camera locations. As depicted in FIG. 11, the lasers for generating the skewed beams 110 and 112 are located on the circumference of the IR optics system and the digital camera is mounted off-axis. As depicted in FIG. 2, for close focus systems the energy spot is a minimum size at the focal length and increases in size for locations in front of or behind the focal length. The skewed laser beams are oriented to indicate the size of the energy zone as described in the referenced patent.

Although the digital camera is depicted off axis in FIG. 11, an alternative embodiment would have the digital camera coaxial with the IR optics, because, as described below, the current embodiment does not depend on parallax to determine the diameter of the displayed circle.

FIGS. 11A-C depict the positions of the skewed laser beams projected onto objects at different locations relative to the camera for this embodiment of the invention. As depicted in FIG. 11A, the spots are horizontal when the object is near the camera, as depicted in FIG. 11C, the spots are vertical when the object is at the focal plane, and, as depicted in FIG. 11B, the spots are at an intermediate position when the object is located between the focal plane and a plane near the camera. Also, the displacement between the spots decreases as the object moves from a location near to the camera to a location at the focal plane to conform with the changing size of the energy zone as depicted in FIG. 2.

Figure 11D:
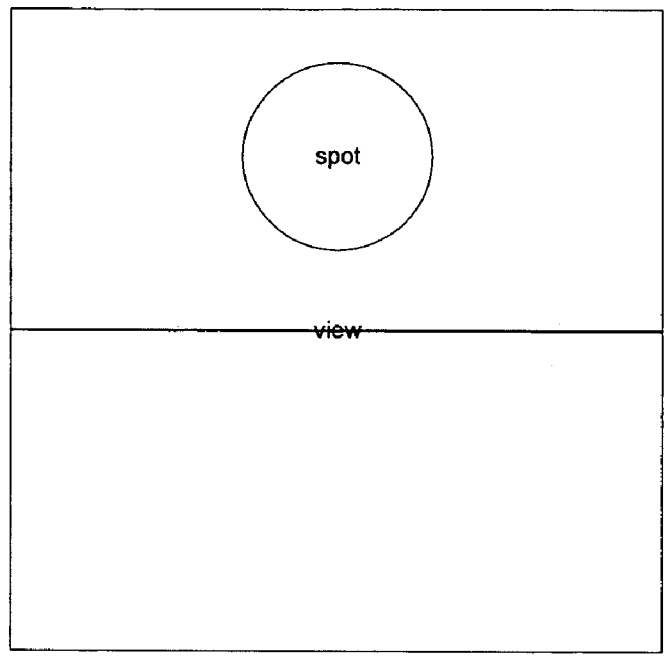
FIG. 11D depicts the displacement of the position of the energy zone in the display at various distances due to parallax.
Figure 11D:
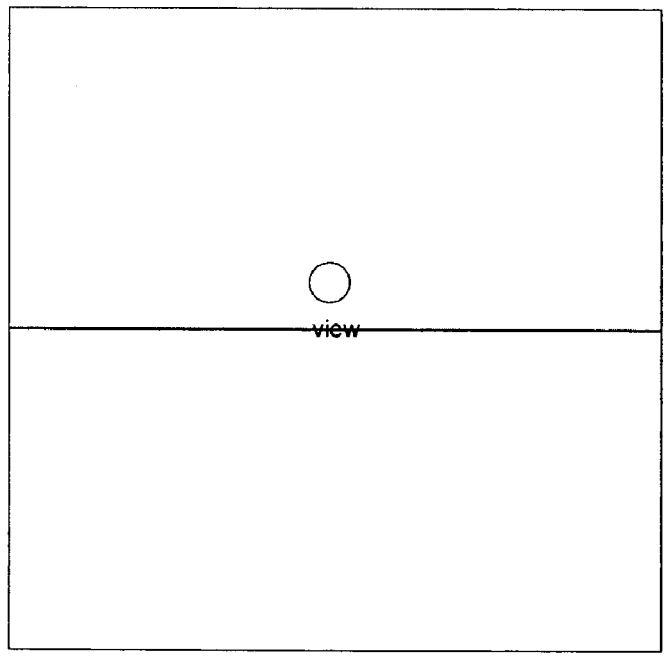
Figure 11D:
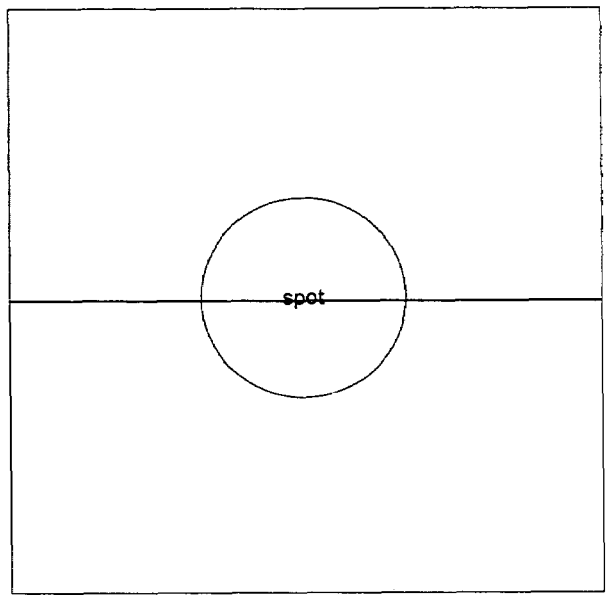

In the case where the video display axis is not coaxial with the IR optics the energy zones will not be displayed as concentric circles as depicted in FIG. 3. Instead, as depicted in FIG. 11D, the position of the circle in the display will appear above the center of the display when the object to be imaged is close to the radiometer and the video system is mounted below the IR optics. At long distances the circle will be located very near to the center of the display.

Figure 12:
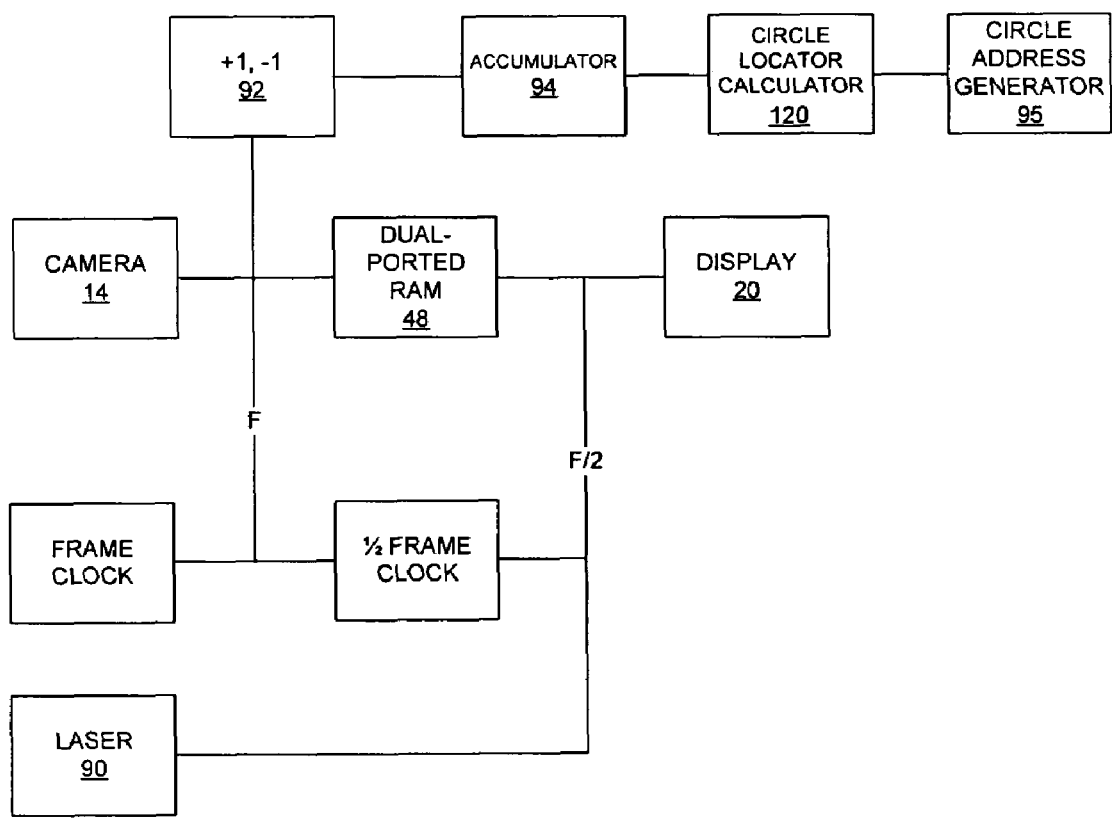
FIG. 12 is a block diagram of an embodiment utilizing imaged skewed laser spots to overlay a circle indicating the extent of the energy zone.

FIG. 12 is a block diagram of an embodiment of an overlay system utilizing the skewed laser beams. Most of the blocks are similar to FIG. 9, except the output of the accumulator 94 is coupled to a circle locator calculator 120 having an output coupled to the circle address generator 95.

Figure 13:
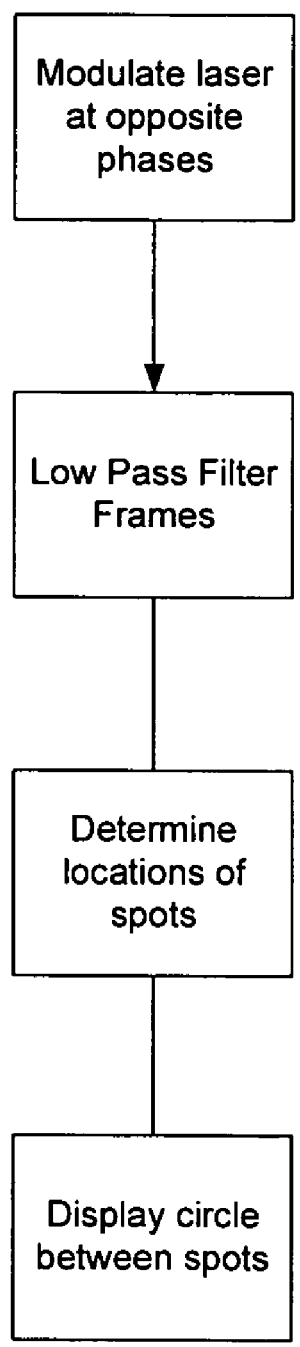
FIG. 13 is a flowchart depicting steps for utilizing the embodiment of FIG. 12.

The operation of the system of FIG. 12 will now be described with reference to the flow chart of FIG. 13. In this embodiment the lasers are modulated in opposite phase so that one laser is on when the other is off. This helps to better determine where each individual laser spot is located. If the lasers are pulsed together there is some significant risk the spots will be confused. In this embodiment the laser beam spots will be visible on the display.

The location of the two laser spots can be determined as described above with reference to FIGS. 9 and 10 or by other low-pass filtering techniques. In this embodiment about ten (10) consecutive images from the visible camera are used. The scenes are multiplied by +/−1 as noted, and "low passed" by using a "running average" where each new entry is weighted by 1/10 and added to 9/10 times the "old" sum. A "running average" (or any averaging of the pairs of images) is only needed when there are movements within the scene or the instrument itself is moving.

More generally, 1/N of the latest scene is added to (N−1)/N of the previously existing sum of scenes. One of the skewed laser's location in the visible scene sum will have the greatest positive peak value, while the other laser's location will have the greatest negative peak value because one laser spot was multiplied by +1, and the other was multiplied by −1.

For example, if a CMOS visible camera is run at 60 Hz to locate the laser beams as quickly as possible then the lasers can be modulated at 30 Hz, which is fast enough so that the modulation of the laser beams is not visible to the eye. Faster cameras can be utilized but will increase the cost of the device.

In this embodiment, the circle locator calculator 120 determines the proper circle to be displayed by the video subsystem to indicate the extent of the energy zone. The endpoints of the circle are directly indicated by the locations of the laser spots ($x_1$, $y_1$; $x_2$, $y_2$) and the center of the circle is the midpoint of the diameter located at ($x_1$, $y_1$)/2, ($x_2$, $y_2$)/2. A circle selection indication is output to the circle address generator to select a circle to overlay over the image of the object to be measured.

The circle locator calculator can be programmed to determine the arc length between the imaged laser spots and determine the diameter of a circle to be displayed as a function of the determined arc length. In this case, the diameter may not be exactly equal to the arc length between the imaged laser spots.

Figure 14:
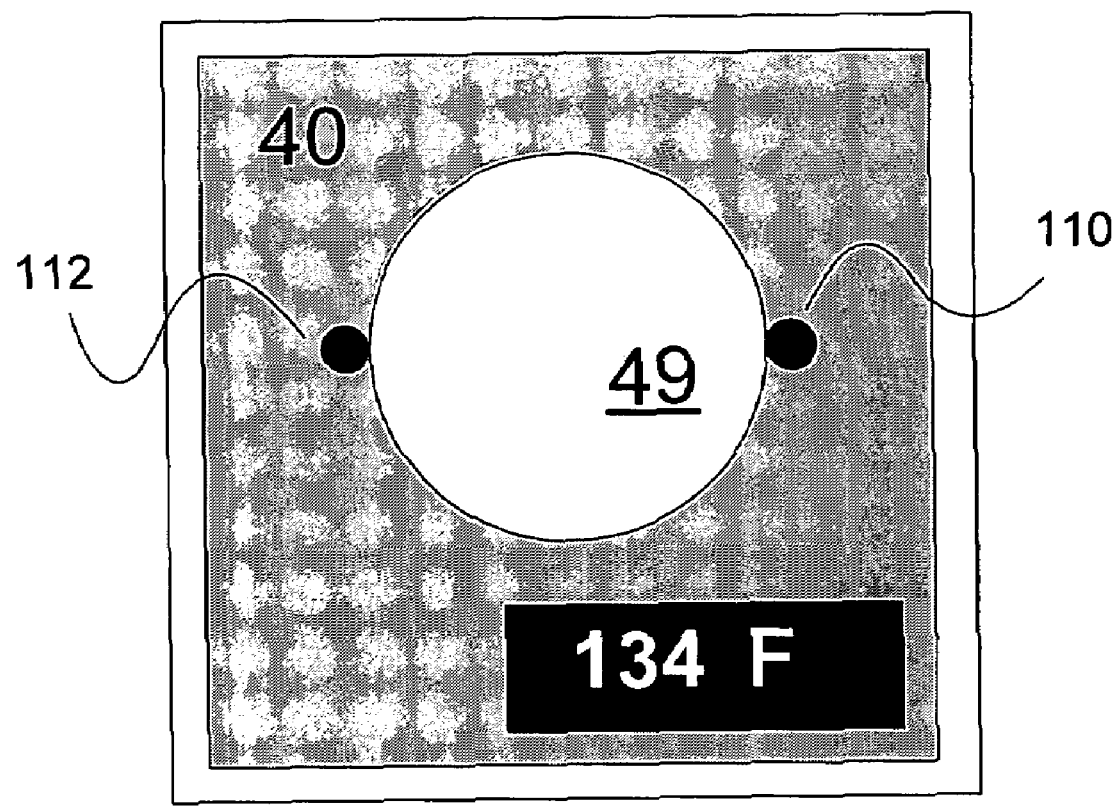
FIG. 14 is a schematic diagram depicting a circular overlay in relation to the imaged skewed laser spots.

FIG. 14 depicts the display where the object imaged is a rectangular surface 40 and the two laser beam spots from the skew beams are depicted in the image. In the embodiment described above, these beams will not be displayed if the laser is modulated at F/2 and the filtering techniques described are utilized. Alternatively, it may be desirable to display the laser beams. In either case, the overlay circle is displayed with its center at the midpoint between the imaged laser spots and a radius of half the displacement between the imaged spots in the display.

Thus, in this embodiment, there is no calculation of the range between the non-contact IR thermal measurement device and the object to be imaged. Instead, the properties of the skewed beam device are utilized to determine the correct overlay to outline the energy zone in the display.

Figure 8:
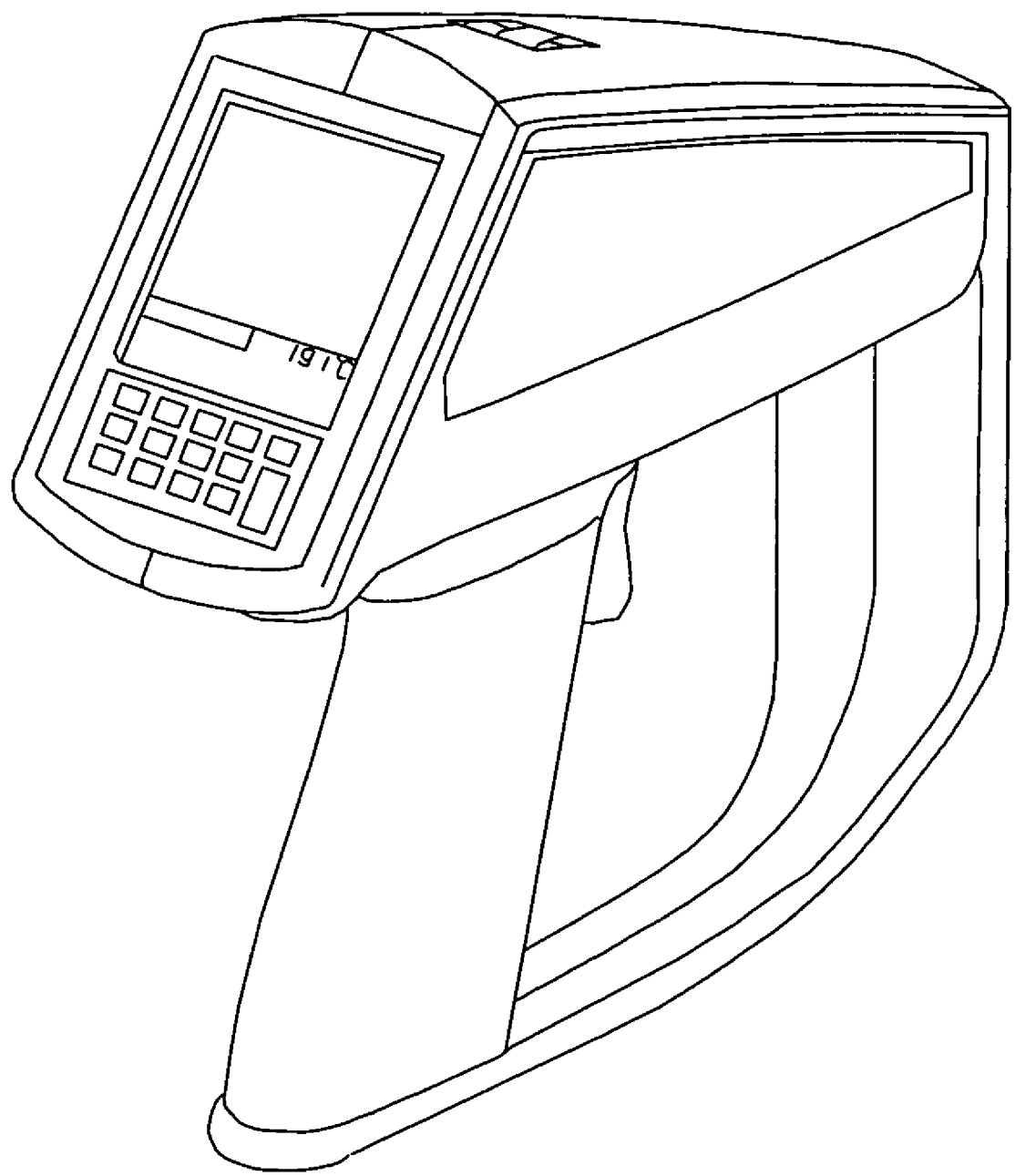
FIG. 8 is perspective view of a product configuration for use with an embodiment of the invention

FIG. 8 depicts a possible product configuration for use with an embodiment of the invention which includes a housing having an integral grip and a digital display device formed therein. The IR optical system, digital imaging system, and rangefinder are internal and not visible in the diagram.

The various functional blocks depicted in the figures may be implemented as software including program code, stored on a computer readable medium, that is executed by a digital computer or by combinations of hardware and software. The computer readable medium may include, among other things, magnetic media, optical media, electromagnetic fields encoding digital information, and so on.

Alternatives and substitutions will now be apparent to persons of ordinary skill in the art. For example, the above-described embodiment employs an optical system that images a circular energy zone. However, the invention also applies to radiometers having optical systems that image other shapes such as ellipses, rectangles, etc. Further, the invention is equally applicable to systems having close focusing or distant focusing IR optics. Additionally, although a laser light source has been described other light sources, such as light emitting diodes (LEDs) can also be utilized. Also, other techniques are known for overlaying a geometric figure on an image and can be employed to implement different embodiments of the invention. Accordingly, it is not intended to limit the invention except as provided by the appended claims.

What is claimed is:

1. A system for indicating the location of an energy zone on an object surface, with the energy zone being an area on the object surface that is imaged onto an IR detector by the IR optical system included in a non-contact IR thermal measurement device, said system comprising:

a light source for projecting a light beam spot on the object surface;

a video sub-system for displaying a displayed image of at least a part of the object surface and the light beam spot;

a shape size determining sub-system, coupled to the video sub-system, that utilizes the video sub-system and location of the light beam spot to determine the size of an energy zone indicating shape to be displayed; and an optical overlay sub-system, coupled to the shape size determining sub-system and video sub-system, for displaying the shape over a displayed image of the object surface and with an overlayed shape indicating the part of the displayed image included in the energy zone.

2. The system of claim 1 where the video sub-system outputs frames at a frequency of F and where the range-finding sub-system comprises:

a laser diode for emitting a laser-beam along a first optical axis to form a laser spot on an object to be imaged;

a clock source for modulating the laser;

a digital filtering sub-system for determining the location of the laser spot in image frames output by the video sub-system; and a shape size calculator for indicating the size of the shape to be displayed based on the location of the laser spot.

3. The system of claim 2 where the laser is modulated at a frequency of F/2 and where the digital filtering sub-system comprises:

a +1, –1 multiplier, coupled to receive frames output from the video system, that alternately multiplies frames output from the video by +1 and –1;

an accumulator, coupled to an output of the +1, –1 multiplier, for summing frames output from the +1, –1 multiplier to subtract the object image from the image of the laser spot.

4. A system for indicating the location of an energy zone on an object surface, with the energy zone being an area on the object surface that is imaged onto an IR detector by the IR optical system included in a non-contact IR thermal measurement device, said system comprising:

a video sub-system for displaying a displayed image of at least a part of the object surface;

at least two laser diodes for emitting skewed laser beams to form at least two laser spots on an object to be imaged that indicate the periphery of the energy zone which varies at different locations;

a laser spot location indicator that indicates the locations of the laser spots in the displayed image; and an optical overlay sub-system, coupled to the video sub-system and the laser spot location indicator, for overlaying a shape outline, having a dimension determined by locations of the laser spots, over a displayed image of the object surface and with the shape outline substantially centered between the imaged skewed laser spots and having a diameter substantially equal to the displacement between the laser spots, with the shape outline indicating the part of a displayed image included in the energy zone.

5. The system of claim 4 further comprising:

a digital filtering sub-system for determining the location of the laser spots in image frames output by the video sub-system.

6. The system of claim 5 where the laser is modulated at a frequency of F/2 and where the digital filtering sub-system comprises:

a +1, −1 multiplier, coupled to receive frames output from the video system, that alternately multiplies frames output from the video by +1 and −1; and an accumulator, coupled to an output of the +1, −1 multiplier, for summing frames output from the +1, −1 multiplier to subtract the object image from an image of the laser spot.

7. A system for indicating the location of an energy zone on an object surface, with the energy zone being an area on the object surface that is imaged onto an IR detector by the IR optical system included in a non-contact IR thermal measurement device, said system comprising:

a video sub-system for displaying a displayed image of at least a part of the object surface;

a light source for emitting a light beam to form a light spot on an object to be imaged;

a light spot location indicator that indicates the location of the light spot in the displayed image; and an optical overlay sub-system, coupled to the video sub-system and the light spot location indicator, for overlaying a shape outline, having a dimension determined by the location of the light spot, with the shape outline indicating the part of a displayed image included in the energy zone.

* * * * *